(12) United States Patent
Bickerstaff

(10) Patent No.: US 8,660,965 B1
(45) Date of Patent: Feb. 25, 2014

(54) SYSTEM AND METHOD FOR MOBILE PROXIMITY ORDERING

(75) Inventor: Ryan M. Bickerstaff, Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 501 days.

(21) Appl. No.: 12/720,042

(22) Filed: Mar. 9, 2010

(51) Int. Cl.
*G06Q 20/00* (2012.01)

(52) U.S. Cl.
USPC ........ 705/64; 705/26.1; 705/26.2; 705/14.57; 705/14.58; 235/379; 235/380

(58) Field of Classification Search
USPC ................... 705/28, 64, 26.1, 14.57, 14.58; 235/379, 380
See application file for complete search history.

(56) References Cited

U.S. PATENT DOCUMENTS

| | | | | |
|---|---|---|---|---|
| 6,026,375 | A * | 2/2000 | Hall et al. | 705/26.43 |
| 6,435,406 | B1 * | 8/2002 | Pentel | 235/380 |
| 6,612,488 | B2 * | 9/2003 | Suzuki | 235/380 |
| 6,880,750 | B2 * | 4/2005 | Pentel | 235/380 |
| 7,110,744 | B2 * | 9/2006 | Freeny, Jr. | 455/406 |
| 7,194,423 | B2 * | 3/2007 | Walker et al. | 705/14.35 |
| 7,343,174 | B2 * | 3/2008 | Suryanarayana et al. | 455/553.1 |
| 7,496,542 | B2 * | 2/2009 | Hibler et al. | 705/67 |
| 7,853,521 | B2 * | 12/2010 | Williams | 705/39 |
| 2002/0198790 | A1 * | 12/2002 | Paulo et al. | 705/26 |
| 2003/0220835 | A1 * | 11/2003 | Barnes, Jr. | 705/14 |
| 2004/0214597 | A1 * | 10/2004 | Suryanarayana et al. | 455/552.1 |
| 2004/0260607 | A1 * | 12/2004 | Robbins et al. | 705/14 |
| 2005/0108097 | A1 * | 5/2005 | McAleenan | 705/15 |
| 2006/0178943 | A1 * | 8/2006 | Rollinson et al. | 705/26 |
| 2007/0257774 | A1 * | 11/2007 | Stumpert et al. | 340/7.1 |
| 2008/0010121 | A1 * | 1/2008 | McIntosh | 705/14 |
| 2008/0134235 | A1 * | 6/2008 | Kalaboukis | 725/32 |
| 2008/0195505 | A1 * | 8/2008 | Kirkpatrick | 705/26 |
| 2008/0270224 | A1 * | 10/2008 | Portman et al. | 705/10 |
| 2009/0084840 | A1 * | 4/2009 | Williams et al. | 235/379 |
| 2009/0150218 | A1 * | 6/2009 | Brunner et al. | 705/10 |
| 2009/0207073 | A1 * | 8/2009 | Thandu et al. | 342/357.1 |
| 2009/0228325 | A1 * | 9/2009 | Simmons et al. | 705/10 |
| 2009/0307096 | A1 * | 12/2009 | Antonellis | 705/15 |
| 2009/0313138 | A1 * | 12/2009 | Ratnakar | 705/27 |
| 2010/0082397 | A1 * | 4/2010 | Blegen | 705/10 |
| 2010/0125500 | A1 * | 5/2010 | Beavers et al. | 705/14.51 |
| 2010/0185501 | A1 * | 7/2010 | Chou et al. | 705/14.4 |
| 2010/0274680 | A1 * | 10/2010 | Carlson et al. | 705/26 |

(Continued)

OTHER PUBLICATIONS

Sorrel, Charlie, Handskake Swaps iPhone Contacts Over the Air; Oct. 23, 2008; http://wired.com/gadgetlab/2008/10/handshake-swaps/.

*Primary Examiner* — Mamon Obeid
(74) *Attorney, Agent, or Firm* — Osha Liang LLP

(57) ABSTRACT

A method for transmitting an order from a mobile device to a physical location of a merchant involves receiving, by the mobile device, the order while the mobile device is outside a predetermined distance from the physical location, storing the order to a storage device, and determining, by the mobile device and after storing the order, that the mobile device is within the predetermined distance from the physical location. The method further involves receiving, by the mobile device, a request from the user to submit the order after determining the mobile device is within the predetermined distance from the physical location, retrieving the order from the storage device in response to the request, and transmitting the order to the merchant after retrieving the order when the mobile device is within the predetermined distance of the physical location.

18 Claims, 6 Drawing Sheets

(56) References Cited

U.S. PATENT DOCUMENTS

| | | | |
|---|---|---|---|
| 2010/0280874 A1* | 11/2010 | Thorn | 705/10 |
| 2010/0280956 A1* | 11/2010 | Chutorash et al. | 705/64 |
| 2011/0125394 A1* | 5/2011 | Horstemeyer | 701/200 |
| 2011/0125566 A1* | 5/2011 | McLaughlin et al. | 705/14.23 |
| 2011/0137698 A1* | 6/2011 | Meyer et al. | 705/7.13 |
| 2011/0295686 A1* | 12/2011 | Martin-Cocher | 705/14.49 |
| 2012/0179549 A1* | 7/2012 | Sigmund et al. | 705/14.58 |
| 2013/0024284 A1* | 1/2013 | Droznin et al. | 705/14.57 |
| 2013/0080280 A1* | 3/2013 | Scipioni | 705/26.1 |

* cited by examiner

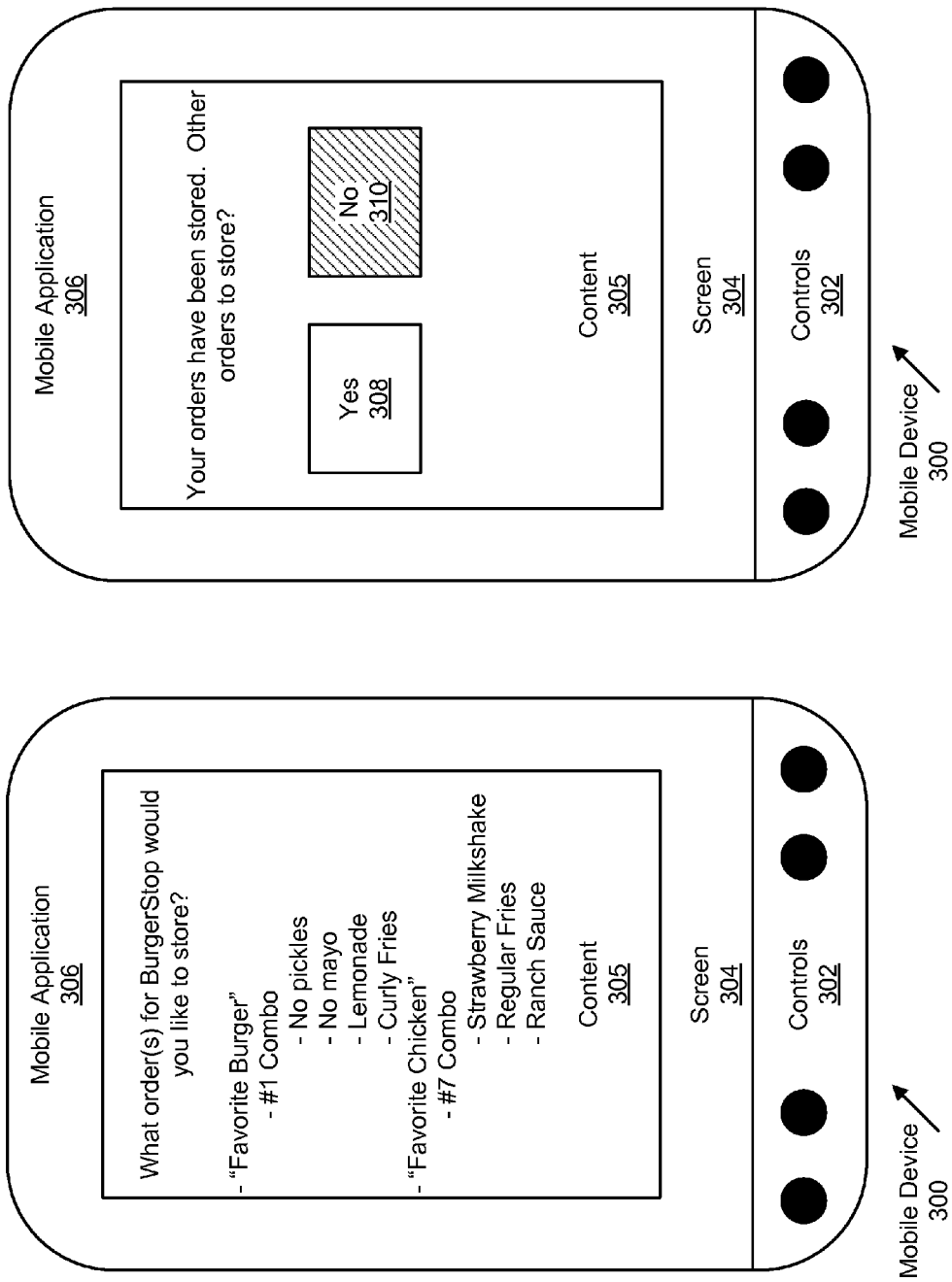

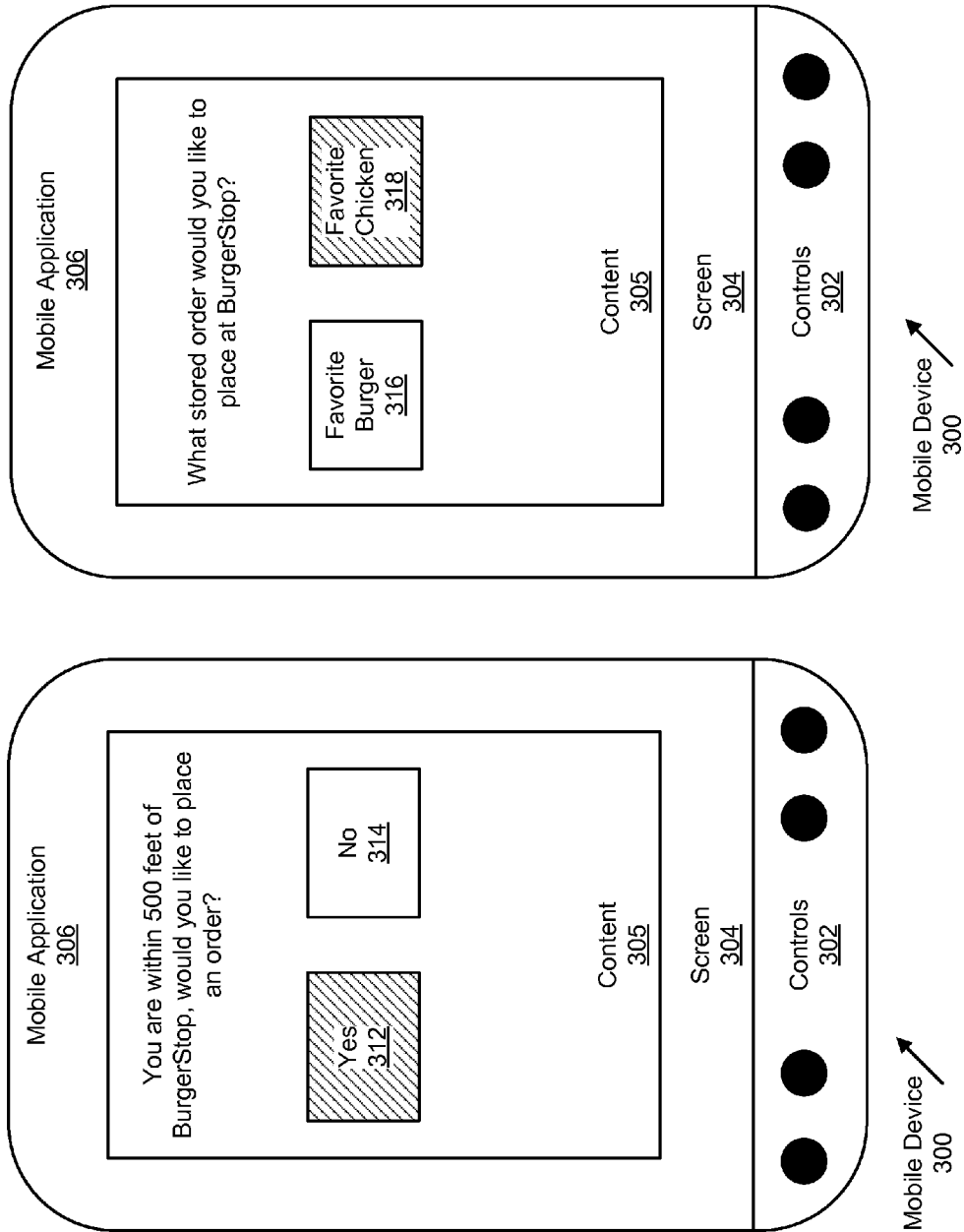

SYSTEM AND METHOD FOR MOBILE PROXIMITY ORDERING

BACKGROUND OF INVENTION

Currently, placing an order for an item at the merchant's store (e.g., ordering food at a fast-food restaurant, a coffee at a coffee house, etc) is inefficient and may result in an incorrect order. Incorrect orders may occur, for example, when the cashier, or other employee that customers place orders with, hears the order incorrectly, enters the order incorrectly, or a variety of other things may interfere with the ordering process. Inefficiencies may be caused by a limited number of people taking orders thereby creating a line, having to state an order each visit even when the same thing is always ordered, and other relevant situations.

SUMMARY OF INVENTION

In general, in one aspect, the invention relates to a method for transmitting an order from a mobile device to a physical location of a merchant. The method involves receiving, by the mobile device, the order while the mobile device is outside a predetermined distance from the physical location, storing the order to a storage device, determining, by the mobile device and after storing the order, that the mobile device is within the predetermined distance from the physical location, receiving, by the mobile device, a request from the user to submit the order after determining the mobile device is within the predetermined distance from the physical location, retrieving the order from the storage device in response to the request, and transmitting the order to the merchant after retrieving the order, wherein the order is transmitted only when the mobile device is within the predetermined distance of the physical location.

In general, in one aspect, the invention relates to a system for transmitting an order from a mobile device to a physical location of a merchant. The system includes a mobile device comprising a memory and a processor, the processor operatively connected to the memory and comprising functionality for executing instructions for: receiving, by the mobile device, the order while the mobile device is outside a predetermined distance from the physical location, determining, by the mobile device and after storing the order, that the mobile device is within the predetermined distance from the physical location, receiving, by the mobile device, a request from the user to submit the order after determining the mobile device is within the predetermined distance from the physical location, retrieving the order from the storage device in response to the request, and transmitting the order to the merchant after retrieving the order, wherein the order is transmitted only when the mobile device is within the predetermined distance of the physical location, and a storage device configured to store the order.

In general, in one aspect, the invention relates to a computer readable storage medium comprising instructions for transmitting an order from a mobile device to a physical location of a merchant. The instructions have functionality to: receive, by the mobile device, the order while the mobile device is outside a predetermined distance from the physical location, store the order to a storage device, determine, by the mobile device and after storing the order, that the mobile device is within the predetermined distance from the physical location, receive, by the mobile device, a request from the user to submit the order after determining the mobile device is within the predetermined distance from the physical location, retrieve the order from the storage device in response to the request, and transmit the order to the merchant after retrieving the order, wherein the order is transmitted only when the mobile device is within the predetermined distance of the physical location.

Other aspects and advantages of the invention will be apparent from the following description and the appended claims.

BRIEF DESCRIPTION OF DRAWINGS

FIGS. 3A-E show an example in accordance with one or more embodiments of the invention.

DETAILED DESCRIPTION

Figure 1:
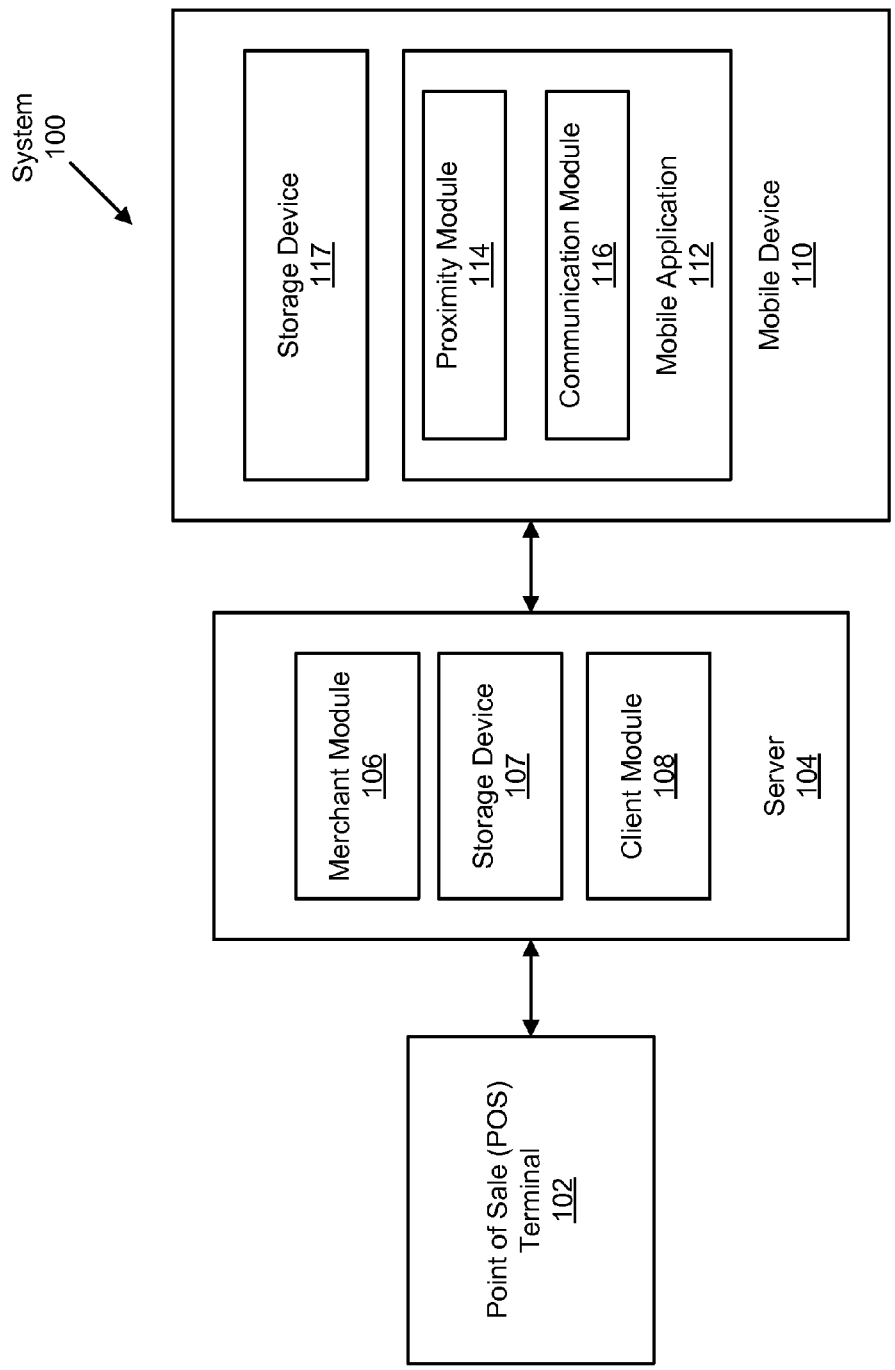
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for mobile proximity-based ordering. Specifically, an order for an item is received and stored, either before or during the ordering process. Then, when the mobile device enters a predetermined distance from a physical location of a merchant, the option to place the order becomes available. The user is then able to place an order with the merchant using the mobile device. Additionally, the user may be able to pay using the mobile device, receive a receipt on the mobile device, and other functions.

FIG. 1 shows a diagram of a system in accordance with one or more embodiments of the invention. As show in FIG. 1, System (100) includes a Point of Sale (POS) Terminal (102), a Server (104) and a Mobile Device (110). In one or more embodiments of the invention, the Server (104) includes a Merchant Module (106), Storage Device (107) (e.g., a tangible computer readable storage device, a hard disk, an optical drive such as a compact disk drive or digital video disk (DVD) drive, a flash memory stick, etc.), and a Client Module (108). In one or more embodiments of the invention, the Mobile Device (110) includes a Storage Device (117) (e.g., a tangible computer readable storage device, a hard disk, an optical drive such as a compact disk drive or digital video disk (DVD) drive, a flash memory stick, etc.) and a Mobile Application (112), which includes a Proximity Module (114) and a Communications Module (116). To the extent necessary, each aforementioned component is discussed in detail below.

The POS Terminal (102) may be any terminal capable of receiving and/or processing orders (e.g., cash register, computer, remote server, etc.). In one or more embodiments of the invention, the POS Terminal (102) is physically located at a cash register stand within a merchant. Alternatively, the POS Terminal (102) may be mobile and/or located at another location within the merchant. In one or more embodiments of the invention, the POS Terminal (102) is communicatively connected to the Server (104). In another embodiment, the POS Terminal (102) may communicate directly with the Mobile Device (110) or communicate with the Mobile Device (110) via the Server (104).

In one or more embodiments of the invention, the Server (104) may be any physical, tangible device capable of transmitting and/or storing data (e.g., a hardware server, a personal computer, a laptop computer, etc.) The Server (104) may be communicatively connected to one or both the POS Terminal (102) and the Mobile Device (110). In one or more embodiments of the invention, a third party (other than the merchant) controls the Server (104). In one or more embodiments of the invention, the merchant controlling the POS Terminal (102) may also control the Server (104). The Server (104) may be used for storing orders, bills, or other information relevant for the merchant. In one or more embodiments of the invention, the Server (104) handles all communication between the merchant (i.e., using the POS Terminal (102)) and the purchaser (i.e., using the Mobile Device (110)) by executing the Merchant Module (106) and the Client Module (108), respectively.

In one or more embodiments of the invention, the Merchant Module (106) is a software application, or component thereof, with functionality for communicating with merchants and handling requests involving the POS Terminal (102) or other similar device as described above. For example, in one or more embodiments of the invention, the Merchant Module (106) includes functionality to transmit orders to, payments to, or receive bills from the POS Terminal (102). It will be apparent to one of ordinary skill in the art that the Merchant Module (106) includes functionality to handle communication with merchants and may have additional functionality and, as such, should not be limited merely to the above examples. In one or more embodiments of the invention, the Merchant Module (106) is also communicatively connected with the Client Module (108)

In one or more embodiments of the invention, the Client Module (108) is a software application, or component thereof, with functionality for communicating with and handling requests from the Mobile Device (110). For example, in one or more embodiments of the invention, the Client Module (108) may include functionality to receive orders and requests from and transmit bills to the Mobile Device (110). It will be apparent to one of ordinary skill in the art that the Client Module (108) may include functionality to handle communication involving the Mobile Device (110) and may have additional functionality, and as such, should not be limited merely to the above examples.

In one or more embodiments of the invention, the Mobile Device (110) includes any mobile device capable of processing data (e.g., a cell phone, a Personal Digital Assistant (PDA), a handheld gaming device, a laptop computer, a mobile media players, etc). In addition to the Storage Device (117), the Mobile Device (110) may include standard components including, but not limited to: a processor (not shown), a memory (not shown), a display (not shown), input devices (not shown), and others components know to be used in a mobile device. In one or more embodiments of the invention, the Mobile Device (110) stores instructions for executing the Mobile Application (112). Alternatively, in one or more embodiments of the invention, the Mobile Application (112) is a thin-client program, and therefore stored at another location (e.g., at a remote server, etc). In one or more embodiments of the invention, the Mobile Application (112) includes functionality for receiving orders, storing orders, transmitting orders, or any other step of the present invention performed on or by the Mobile Device (110). Additionally, the Mobile Application (112) may include a Proximity Module (114) and a Communication Module (116).

In one or more embodiments of the invention, the Proximity Module (114) includes functionality to determine the distance of the Mobile Device (110) from a merchant. In one or more embodiments of the invention, the location of a merchant is determined based on the corresponding location of a physical device (e.g., the POS Terminal (102)). Alternatively, the location of a merchant is determined based on an arbitrary point (e.g., Global Positioning System (GPS) coordinates) selected by the merchant or other suitable entity. The Proximity Module (114) may only include functionality to determine distances for merchants that have previously stored orders associated with the merchant. Alternatively, The Proximity Module (114) may only include functionality to determine distances to all nearby merchants. It will be apparent that the distance may be measured in any measurement scale or standard (e.g., imperial, metric, standard, etc.) and be determined using any method known to one of ordinary skill in the art. In one or more embodiments of the invention, the Proximity Module (114) may be responsible for calculating (and/or determining) the predetermined distance at which orders are able to be placed.

In one or more embodiments of the invention, a predetermined distance is how close a mobile device (such as Mobile Device (110)) needs to be to a merchant before an order is capable of being placed. For example, the predetermined distance may be 500 feet, 1000 feet, ½ mile, 1 mile, 2 miles, etc. In one or more embodiments of the invention, the predetermined distance is a radius from the physical location of the merchant (i.e., a radial distance from a center point defined by the physical location of the merchant). Items within the radius from the physical location may include, for example, the merchant's store, the parking lot, and nearby streets/sidewalks. The predetermined distance may be set by a user of the Mobile Device (110). Alternatively, each merchant may set its own predetermined distance as any designated distance from the merchant (in one or more directions). In one or more embodiments of the invention, a default predetermined distance may exist, such as a half mile radius around the physical store of the merchant. Additionally, a Proximity Module (114) may maintain other restrictions on when orders may be placed, such as time or monetary restrictions. For example, a parent may set a child's phone to only allow an order to be placed between 3:00 PM and 4:00 PM, or only allow orders to be placed for less than fifteen dollars. It will be apparent to one of ordinary skill in the art that a variety of restrictions may be placed on making orders and, as such, the invention should not be limited to the above examples.

In one or more embodiments of the invention, the Communication Module (116) may include functionality for handling all communications with the Server (104) and the POS Terminal (102). For example, in one or more embodiments of the invention, the Communication Module (116) may include functionality to communicate with the Server (104) for storing, retrieving, or placing orders, paying bills, and/or other requests. Alternatively, the Communication Module (116) may include functionality to communicate directly with the POS Terminal (102) for placing orders, paying or receiving bills, and any other communications. In one or more embodiments of the invention, the Communication Module (116) may include functionality to communicate with the POS Terminal (102) and the Server (104) using the Internet, telephony, or any other suitable communication method. It will be apparent to one of ordinary skill that the possible communications or methods of communication handled by the Communication Module (116) may vary and, as such, the invention should not be limited to the above examples.

Additionally, the Communication Module (116) may include functionality for generating barcodes of orders, as an alternative method of transmittal. Alternatively, a different component (e.g., a remote server, the Mobile Application (112), etc.) may generate the barcode and then send the barcode to the Communication Module (116) to be displayed on the Mobile Device (110). For example, the Communication Module (116) may receive an indication that an order will be placed via barcode, and may then generate a barcode that can be displayed on the Mobile Device (110). The Mobile Device (110) may then be presented to the merchant who scans the barcode to receive the order.

Figure 2:
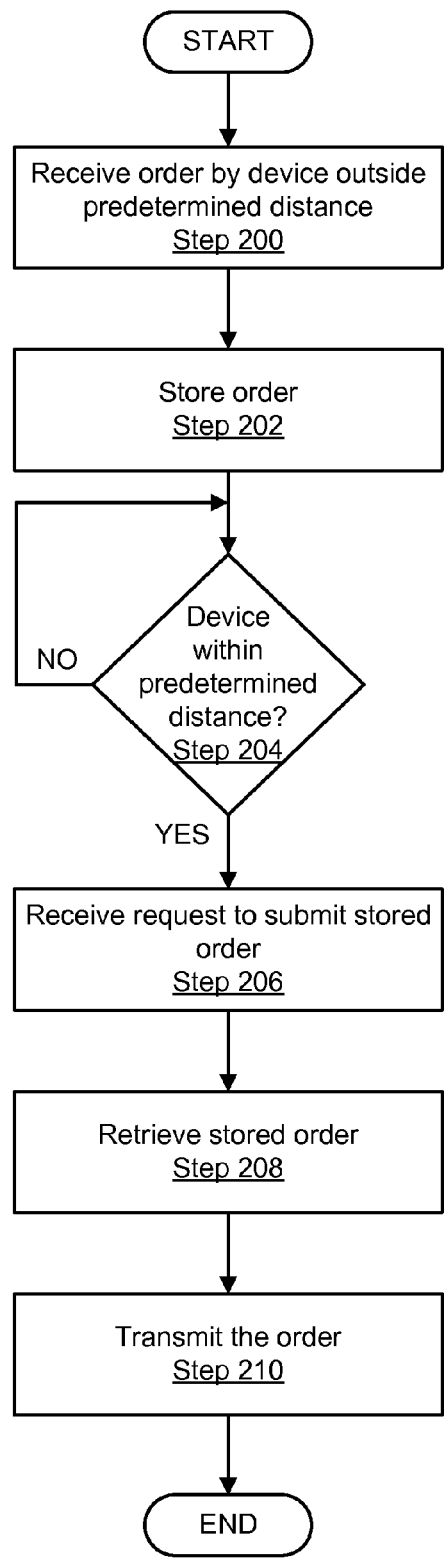
FIG. 2 shows a flowchart of a method in accordance with one or more embodiments of the invention.

FIG. 2 shows a flowchart of a method for mobile proximity ordering. The method of FIG. 2 may be implemented, for example, using the system of FIG. 1. In one or more embodiments of the invention, one or more of the steps shown in FIG. 2 maybe be omitted, repeated, and/or performed in a different order than the order shown in FIG. 2. Accordingly, the scope of the invention should not be considered limited to the specific arrangement of steps shown in FIG. 2.

In Step 200, an order is received outside of a predetermined distance in accordance with one or more embodiments of the invention. The order may be received through use of a software application, or any other suitable method. In one or more embodiments of the invention, the software application may include a listing of all available items for purchase from the merchant, and items may be selected by a user of a mobile device. In one or more embodiments of the invention, orders may be customizable. For example, if ordering a coffee, an order may specify "Soy Milk" or "2% Milk," or any other customization. It will be apparent to one of ordinary skill in the art that an order may be placed and/or received in a variety of manners and, as such, the invention should not be limited merely to the above example.

In Step 202, the order is stored in accordance with one or more embodiments of the invention. In one or more embodiments of the invention, the order may be stored on a mobile device. Alternatively, the order may be stored on any other suitable device, such as a server. It will be apparent to one of ordinary skill in the art that there are a variety of ways and places to store an order and as such, the invention should not be limited to the above examples. Further, it will also be apparent to one of ordinary skill in the art that the primary purpose of storing an order is to be able to quickly retrieve and place the order.

In Step 204, a determination is made whether the device is within the predetermined distance in accordance with one or more embodiments of the invention. In one or more embodiments of the invention, Step 204 may be performed using a mobile application and/or module stored on a mobile device. In one or more embodiments of the invention, the device must be within the predetermined distance (e.g., perimeter of the merchants physical location, 100 feet, 1000 feet, 1 mile, etc.) to allow an order to be placed or to allow for other functionality. Until the device is within the predetermined distance, the determination is continuously performed (e.g., on a regular or semi-regular basis, by polling, etc.), as required or preferred by the user or device. The invention may employ any methodology known in the art to determine whether the device is within the predetermined distance.

After determining that the device is within the predetermined distance, the method proceeds to Step 206. It should be apparent to one of ordinary skill in the art that determining whether the device is within the predetermined distance may occur at any time and therefore, the invention should not be limited to the specific order of steps described above.

In Step 206, a request to submit a stored order is received in accordance with one or more embodiments of the invention. The request may be received by a mobile application executing on a mobile device. Alternatively, the request may be received at a remote server. As described above, in accordance with one or more embodiments of the invention, the request to submit an order is only valid when the mobile device is within a predetermined distance of the merchant.

In Step 208, the order is retrieved in accordance with one or more embodiments of the invention. In one or more embodiments of the invention, the order may be retrieved from storage on the mobile device. Alternatively, the order may be retrieved from storage on a remote server, or other device. Alternatively, the order may not already be saved, and may be created specifically for and during the current order.

In Step 210, once retrieved, the order is transmitted to the merchant in accordance with one or more embodiments of the invention. In one or more embodiments of the invention, the order may be transmitted electronically to the merchant. For example, the order may be transmitted using the Internet, telephony, or any other suitable medium. In one or more embodiments of the invention, the mobile device communicates directly with the merchant. Alternatively, an intermediary, such as a server, may communicate with the merchant. It will be apparent to one of ordinary skill in the art that there are a variety of ways to communicate with a merchant and as such, the invention should not be limited to the above examples.

In one or more embodiments of the invention, as an alternative method of transmitting the order, a barcode is generated by the mobile application. Alternatively, a remote server or other device may generate the barcode. For example, when a user indicates that he/she would like to place an order, the mobile application may generate a barcode for display on the mobile device. The user may then present the mobile device to the merchant while the barcode is displayed. The merchant may then scan the barcode displayed on the mobile device to receive the order.

Additionally, in one or more embodiments of the invention, the merchant may bill the user electronically. The bill may be received by the mobile application, and stored in accordance with one or more embodiments of the invention. Alternatively, the bill may be stored at another location, such as a server in accordance with one or more embodiments of the invention. In one or more embodiments of the invention, the user may pay his or her bill while in the merchant's store using any means accepted by the merchant. Alternatively, the mobile application may facilitate electronic payment through the mobile device. For example, a credit card number, bank account number, or other information may be transmitted to the merchant for payment of the bill.

FIGS. 3A-E show examples in accordance with one or more embodiments of the invention. Specifically, the example in FIGS. 3A-E show storing an order and later placing the order when the mobile device is within a predetermined distance of the merchant's store. It will be apparent to one of ordinary skill in the art that the example in FIGS. 3A-E is only a representative example and, as such, the invention should not be limited to the specific example set forth in FIGS. 3A-E.

In FIGS. 3A-E, a Mobile Device (300) is shown. As described above, the Mobile Device (300) may be any mobile device including, but not limited to, cell phones, PDAs, laptop computers, handheld gaming devices, etc. In general, the Mobile Device (300) includes at least a processor (not shown), memory (not shown), display device (i.e., a Screen (304)), and inputs (i.e., Controls (302)). The Controls (302) may be any portion of a mobile device that allows for input (e.g., touch screen, buttons, microphone, etc.) The Screen (304) may include any component of a mobile device for displaying images. It will be apparent to one of ordinary skill in the art that each of these components may take many different forms and, as such, should not be limited to any configuration described in this example. The Mobile Device (300) includes functionality to execute a Mobile Application (306) for providing functionality to place orders to merchants. Throughout FIGS. 3A-E, the Mobile Device (300), the Controls (302), the Screen (304), and the Mobile Application (306) are the same and accordingly, will not be discussed in much, if any, detail in the figures.

FIG. 3A shows exemplary Content (305) displayed on the Screen (304) of the Mobile Application (306). In this example, a user is creating orders to store for later use. The Content (305) shows that the user creates two orders for BurgerStop, one called "favorite burger" which includes a #1 combo without pickles or mayo, an order of curly fries and a lemonade. The other order is called "favorite chicken" which includes a #7 combo, a strawberry shake, regular fries, and ranch sauce. These orders could be created through a variety of methods including selecting from a list, typing into a document, or any other method. After creating the orders, the orders may be saved (i.e., stored on the Mobile Device (300)). Alternatively, the orders may be saved elsewhere, such as a remote server or other suitable location.

FIG. 3B shows the Mobile Application (306) after the orders are saved. Specifically, the Content (305) of the Mobile Application (306) inquires whether other orders need to be stored, with a Yes (308) option and No (310) option given. The Mobile Application (306) may include functionality to store orders for many different merchants of various types, sizes, etc. In FIG. 3B, the No (310) option is selected in accordance with one or more embodiments of the invention.

In FIG. 3C, the Mobile Device (300) indicates as Content (305) on the Screen (304) that the device is within 500 feet of BurgerStop, and prompts the user about placing an order at BurgerStop (i.e., "would you like to place an order?") with a Yes (312) option and No (314) option given. In one or more embodiments of the invention, each time the user is within a predetermined distance of a merchant the user may be prompted by inquiring whether an order should be placed. Alternatively, the user may manually request an order, rather than be prompted. As discussed above, the predetermined distance may be any distance and set by the merchant, the user of the device, or any other suitable entity in accordance with one or more embodiments of the invention. In FIG. 3C, the Yes (312) option is selected in accordance with one or more embodiments of the invention.

In FIG. 3D, the user is shown using the Mobile Application (306) executing on the Mobile Device (300) to place an order. Specifically, the user of the Mobile Device (300) is placing an order that was previously saved (e.g., by storing the order on the Mobile Device (300)) in accordance with one or more embodiments of the invention. In one or more embodiments of the invention, the stored orders are pre-loaded and selected by the user in advance of placing the order.

The choices shown as Content (305) on the Screen (304) in this example are the Favorite Burger (316) option and the Favorite Chicken (318) option. In this example, the user has selected that an order should be placed for Favorite Chicken by selecting the Favorite Chicken (318) option, rather than the Favorite Burger (316) option. In this example, the stored order may be transmitted to the merchant electronically, for example, by using the wireless Internet or telephony capabilities of the Mobile Device (300). Alternatively, the stored order may be transmitted to the merchant from a remote server (not shown).

Figure 3E:
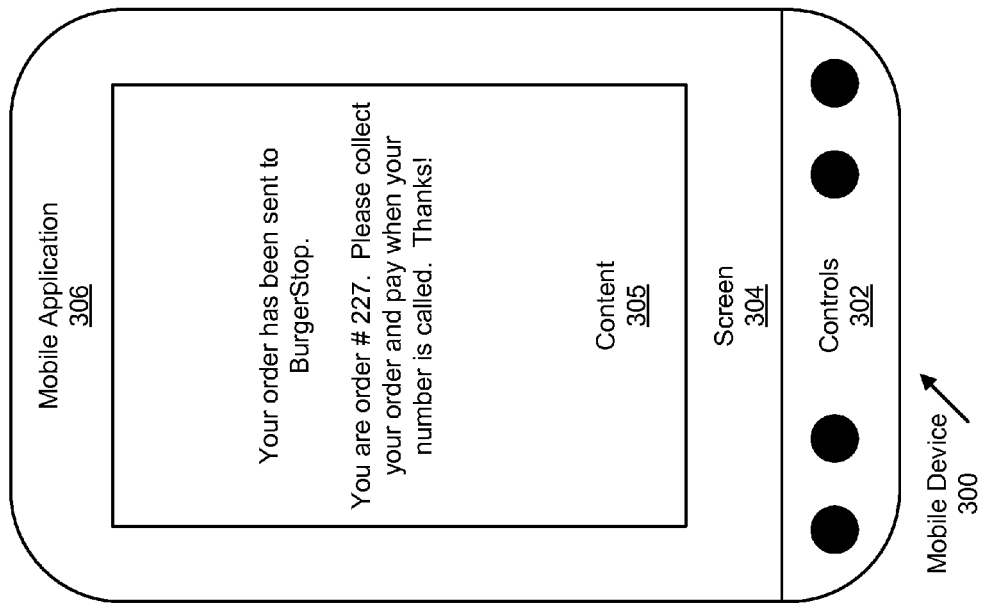

Lastly, in FIG. 3E, the Screen (304) of the Mobile Device (300) indicates that the order has been transmitted to BurgerStop, and BurgerStop has replied with the user's order number as shown by the Content (305) in accordance with one or more embodiments of the invention. In this example, the user will pay for their order upon picking the order up from the merchant. However, in one or more embodiments of the invention, the user may also pay for the order using Mobile Device (300). For example, Mobile Device (300) may be able to transmit a credit card number, bank account number, or use another mobile application or module to facilitate electronic payment of the order.

It will be apparent to one of ordinary skill in the art that the invention offers many advantages and improvements. For example, the present invention increases the ease and accuracy at which a customer may place an order with a merchant. Additionally, in accordance with one or more embodiments of the invention, the order is placed faster and without talking to the merchant. The invention allows the customers to keep track of their spending by electronically storing receipts from items purchased in accordance with one or more embodiments of the invention. For merchants, the invention reduces lines at the merchants' stores, while simultaneously providing some protection from false orders, because the merchant will know the mobile device from which the order is placed, and that the mobile device was within the predetermined distance of the merchant at a certain time. It will be apparent to one of ordinary skill in the art that the above examples are based on one or more embodiments of the invention and are not an exhaustive list of the advantages of the invention.

In one or more embodiments of the invention, the mobile application is linked to a personal financial management application. Thus, when an order is placed in accordance with one or more embodiments of the invention, the order is automatically recorded in the personal financial management application.

It will be apparent to one of ordinary skill in the art that the invention may be applied to many different kinds of merchants and many different kinds of orders. The invention may work best when the merchant at which the order is to be placed uses an electronic system to fill orders, such as at a fast food restaurant. However, the invention may still be used effectively at merchants that do not use electronic systems to fill orders. Additionally, the invention may be more effective at merchants where repeat orders are common, such as coffee shops, restaurants, and other merchants where customers order the same thing repeatedly. However, the invention may still be used effectively where repeat orders are not common.

As an example of other merchants who may use the device besides those described above, consider an amusement park. When the user enters the amusement park he/she may activate the mobile application residing on the mobile device, and use the mobile application as a "ticket" for rides/games. Each ride at the amusement park may have a POS "zone" (that is, a portion of the ride that all riders must pass through before boarding the ride). When an active mobile device passes through the POS "zone," it is recorded that the user rode that particular ride, and the appropriate amount may be charged to the user's mobile device, credit card, or other account. When the mobile application detects that the user is leaving the amusement park, a final bill is presented to the user for payment. Alternatively, the user may authorize the mobile device to pay for the rides before entering the amusement park, and then when the user leaves the park, the mobile device may automatically pay the amusement park the correct amount.

Additionally, as another example, the invention may be used at a sales meeting between a seller and a buyer. The seller could use her mobile device as a POS terminal (i.e., the seller would act as a merchant). The buyer would then be able to view what the seller has for sale and how much. In one or more embodiment of the invention, the seller enters her information entered prior to the meeting, and the buyer has already entered his acceptable price range and desired items for purchase entered. Thus, when the seller and buyer come within the predetermined distance, the mobile application may automatically determine whether the requirements of the buyer match the goods and/or prices of the seller. Thus, it may be determined whether a potential sale could be made.

In one or more embodiments of the invention, merchants may be a charged a service fee to using the invention. This fee may be a percentage of each transaction made, a flat per-month (or any other time unit) fee, or any other suitable fee structure. Alternatively, ads may be sold within the mobile application to generate revenue, or users may pay to buy and/or use the application. It will be apparent to one of ordinary skill in the art that there are a variety of ways to monetize the invention and, as such, the invention should not be limited to the above examples.

Figure 4:
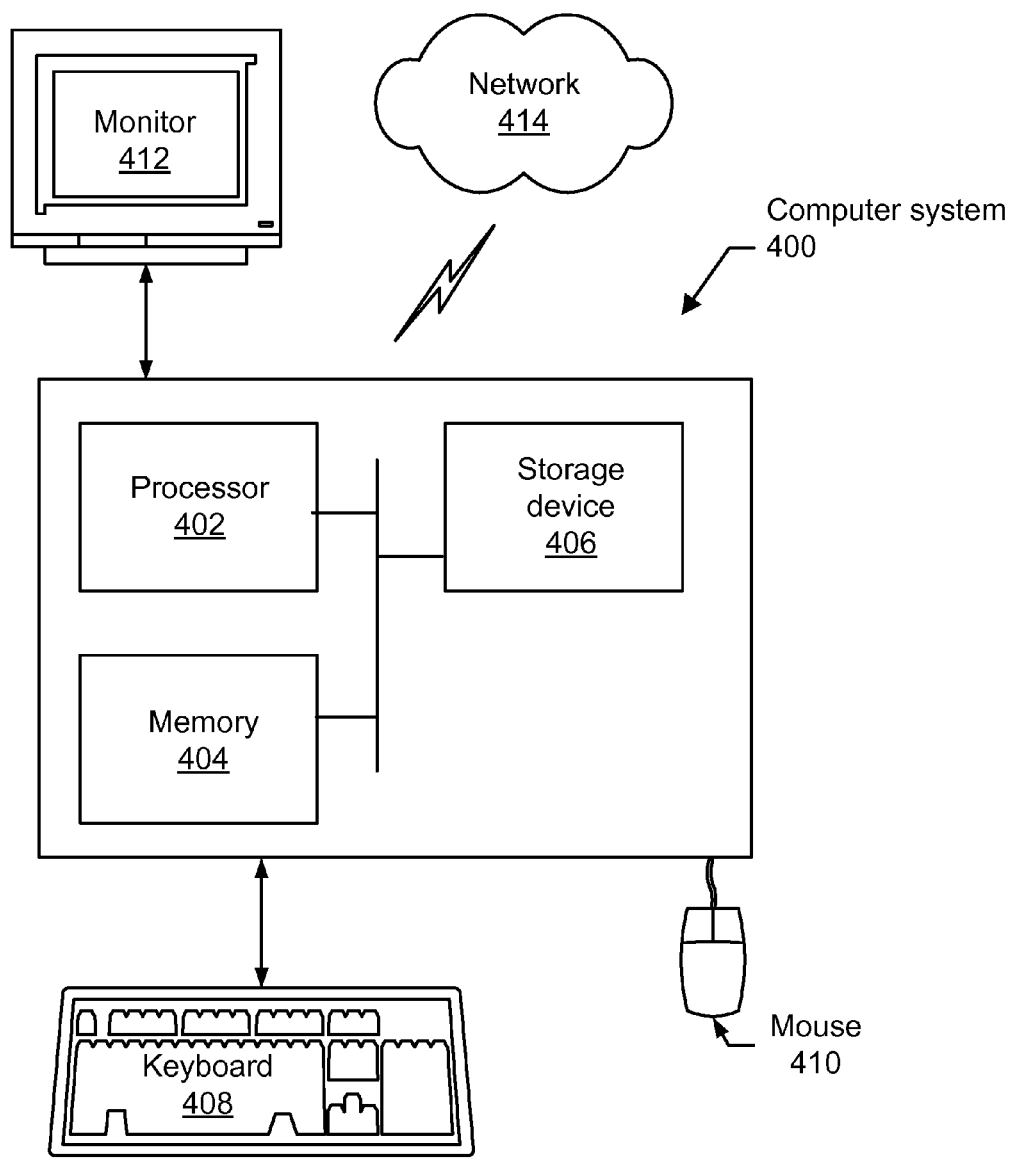
FIG. 4 shows a diagram of a computer system in accordance with one or more embodiments of the invention.

Embodiments of the invention may be implemented on virtually any type of computer, including mobile devices (e.g., cell phone, PDA, laptop, portable gaming device, etc.), regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a tangible computer readable storage device, a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (400) includes at least the minimal processing, input, and/or output means necessary to particularly practice embodiments of the invention.

Further, those skilled in the art will appreciate that one or more elements of the aforementioned computer system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting an order from a smartphone comprising a GPS receiver to a physical location of a merchant, comprising:
   receiving, by the smartphone, the order and a plurality of order restrictions from a user of the smartphone, the plurality of order restrictions comprising:
     a distance restriction specifying a predetermined distance between the smartphone and the physical location of the merchant; and
     an additional restriction selected from a group consisting of a monetary restriction and a time restriction,
   wherein the order and the plurality of order restrictions are received while the smartphone is outside the predetermined distance from the physical location, and
   wherein the GPS receiver is used to determine that the smartphone is outside the predetermined distance from the physical location;
   storing the order and the plurality of order restrictions to a storage device;
   determining, using the GPS receiver and after storing the order and the plurality of order restrictions, that the distance restriction is satisfied because the smartphone is within the predetermined distance from the physical location;
   determining, using a processor of the smartphone and after storing the plurality of order restrictions, that the additional restriction is satisfied;
   displaying, by the smartphone and in response to determining that both the distance restriction and the additional restriction are satisfied, a prompt to the user requesting submission of the stored order;
   receiving, by the smartphone, a request from the user to transmit the stored order in response to the prompt;
   retrieving the stored order from the storage device in response to the request; and
   transmitting the stored order to the merchant after retrieving the stored order.

2. The method of claim 1, wherein the storage device is located on a server, and wherein retrieving the order comprises accessing the storage device located on the server.

3. The method of claim 1, further comprising:
   receiving a bill associated with the order from the merchant;
   storing the bill on the storage device; and
   accessing, using the smartphone, a plurality of funds from a financial institution sufficient to pay the bill; and
   forwarding the plurality of funds to the merchant.

4. The method of claim 1, wherein transmitting the order comprises:
   obtaining, by the smartphone, a barcode corresponding to the order; and
   displaying the barcode on a display screen of the smartphone to the merchant at the physical location, wherein the merchant scans the barcode in order to fulfill the order.

5. The method of claim 1, wherein transmitting the order comprises sending the order to a Point of Sale (POS) terminal of the merchant.

6. A system for transmitting an order, comprising:
a storage device configured to store the order; and
a smartphone comprising a GPS receiver and a processor, configured to:
receive the order and a plurality of order restrictions from a user of the smartphone, the plurality of order restrictions comprising:
a distance restriction specifying a predetermined distance between the smartphone and the physical location of the merchant; and
an additional restriction selected from a group consisting of a monetary restriction and a time restriction,
wherein the order and the plurality of order restrictions are received while the smartphone is outside the predetermined distance from a physical location of a merchant, and
wherein the GPS receiver is used to determine that the smartphone is outside the predetermined distance from the physical location;
store the order and the plurality of order restrictions to the storage device;
determine, using the GPS receiver and after storing the order and the plurality of order restrictions, that the distance restriction is satisfied because the smartphone is within the predetermined distance from the physical location;
determine, using the processor and after storing the order and the plurality of order restrictions, that the additional restriction is satisfied;
display, in response to determining that both the distance restriction and the additional restriction are satisfied, a prompt to the user requesting submission of the stored order;
receive a request from the user to transmit the stored order in response to the prompt;
retrieve the stored order from the storage device in response to the request; and
transmit the stored order to the merchant after retrieving the stored order.

7. The system of claim 6, further comprising:
a server comprising the storage device,
wherein retrieving the order comprises accessing the storage device located on the server.

8. The system of claim 6, wherein the smartphone is further configured to:
receive a bill associated with the order from the merchant;
store the bill on the storage device; and
access, using the smartphone, a plurality of funds from a financial institution sufficient to pay the bill; and
forward the plurality of funds to the merchant.

9. The system of claim 6, wherein transmitting the order comprises:
obtaining a barcode corresponding to the order; and
displaying the barcode on a display screen of the smartphone to the merchant at the physical location, wherein the merchant scans the barcode in order to fulfill the order.

10. The system of claim 6, wherein transmitting the order comprises sending the order to a Point of Sale (POS) terminal of the merchant.

11. A non-transitory computer readable storage medium comprising a plurality of instructions for transmitting an order from a smartphone comprising a GPS receiver to a physical location of a merchant, the plurality of instructions when executed by the smartphone preform a method comprising:
receiving, by the smartphone, the order and a plurality of order restrictions from a user of the smartphone, the plurality of order restrictions comprising:
a distance restriction specifying a predetermined distance between the smartphone and the physical location of the merchant; and
an additional restriction selected from a group consisting of a monetary restriction and a time restriction,
wherein the order and the plurality of order restrictions are received while the smartphone is outside the predetermined distance from the physical location, and
wherein the GPS receiver is used to determine that the smartphone is outside the predetermined distance from the physical location;
storing the order and the plurality of order restrictions to a storage device;
determining, using the GPS receiver and after storing the order and the plurality of order restrictions, that the distance restriction is satisfied because the smartphone is within the predetermined distance from the physical location;
determining, using a processor of the smartphone and after storing the order and the plurality of order restrictions, that the additional restriction is satisfied;
displaying, by the smartphone and in response to determining that both the distance restriction and the additional restriction are satisfied, a prompt to the user requesting submission of the stored order;
receiving, by the smartphone mobile device, a request from the user to transmit the stored order in response to the prompt;
retrieving the stored order from the storage device in response to the request; and
transmitting the stored order to the merchant after retrieving the stored order.

12. The non-transitory computer readable storage medium of claim 11, wherein the storage device is located on a server, and wherein retrieving the order comprises accessing the storage device located on the server.

13. The non-transitory computer readable storage medium of claim 11, wherein the method further comprises:
receiving a bill associated with the order from the merchant;
storing the bill on the storage device;
accessing a plurality of funds from a financial institution sufficient to pay the bill; and
forwarding the plurality of funds to the merchant.

14. The non-transitory computer readable storage medium of claim 11, wherein transmitting the order comprises sending the request to a server, wherein the server transmits the order to the merchant.

15. The non-transitory computer readable storage medium of claim 11, wherein transmitting the order comprises:
obtaining a barcode corresponding to the order; and
displaying the barcode on a display screen of the smartphone to the merchant at the physical location, wherein the merchant scans the barcode in order to fulfill the order.

16. The method of claim 1, wherein the storage device is a component of the mobile device, and wherein retrieving the order comprises accessing the storage device located on the mobile device.

17. The system of claim 6, wherein the storage device is a component of the mobile device, and wherein retrieving the order comprises accessing the storage device located on the mobile device.

18. The non-transitory computer readable storage medium of claim 11, wherein the storage device is a component of the mobile device, and wherein retrieving the order comprises accessing the storage device located on the mobile device.

\* \* \* \* \*